United States Patent [19]

Bigham

[11] Patent Number: 4,460,832

[45] Date of Patent: Jul. 17, 1984

[54] ATTENUATOR FOR PROVIDING A TEST IMAGE FROM A RADIATION SOURCE

[76] Inventor: Keith E. Bigham, 178 Triangle St., Danbury, Conn. 06810

[21] Appl. No.: 273,923

[22] Filed: Jun. 15, 1981

[51] Int. Cl.³ .............................................. G01D 18/00
[52] U.S. Cl. ............................... 250/505.1; 250/252.1; 378/207
[58] Field of Search ........................... 250/252.1, 505.1; 378/207, 157, 158, 159

[56] References Cited

U.S. PATENT DOCUMENTS

| 1,953,249 | 4/1934 | Michel | 378/207 |
| 4,055,771 | 10/1977 | Goodenough et al. | 250/252.1 |
| 4,126,789 | 11/1978 | Vogl et al. | 378/207 |
| 4,280,047 | 7/1981 | Enos | 250/252.1 |

OTHER PUBLICATIONS

Murray et al., "A New Phantom for the Assessment of Nuclear Medicine Imaging Equipment", Phy. Med. Biol., 24 (1), Jan. 1979, pp. 188–192.

"Quality Control for Scintillation Cameras", HEW Pub. (FDA) 76-8046, Jun. 1976.

*Primary Examiner*—Alfred E. Smith
*Assistant Examiner*—Carolyn E. Fields
*Attorney, Agent, or Firm*—Louis H. Reens; Gene S. Winter

[57] ABSTRACT

A nuclear radiation attenuator for providing a test image from a source of radiation is disclosed. The attenuator provides a test image including a plurality of discrete target images located in a background image. Each target image has an intensity that differs from the intensity background image to provide a target to background contrast ratio for each target image. A plurality of the target images each have a different contrast ratio so that the contrast ratios of the target simulate contrast ratios found in clinical testing. The attenuator provides a standardized test image that enables the performance of a scintillation camera to be tested routinely.

14 Claims, 7 Drawing Figures

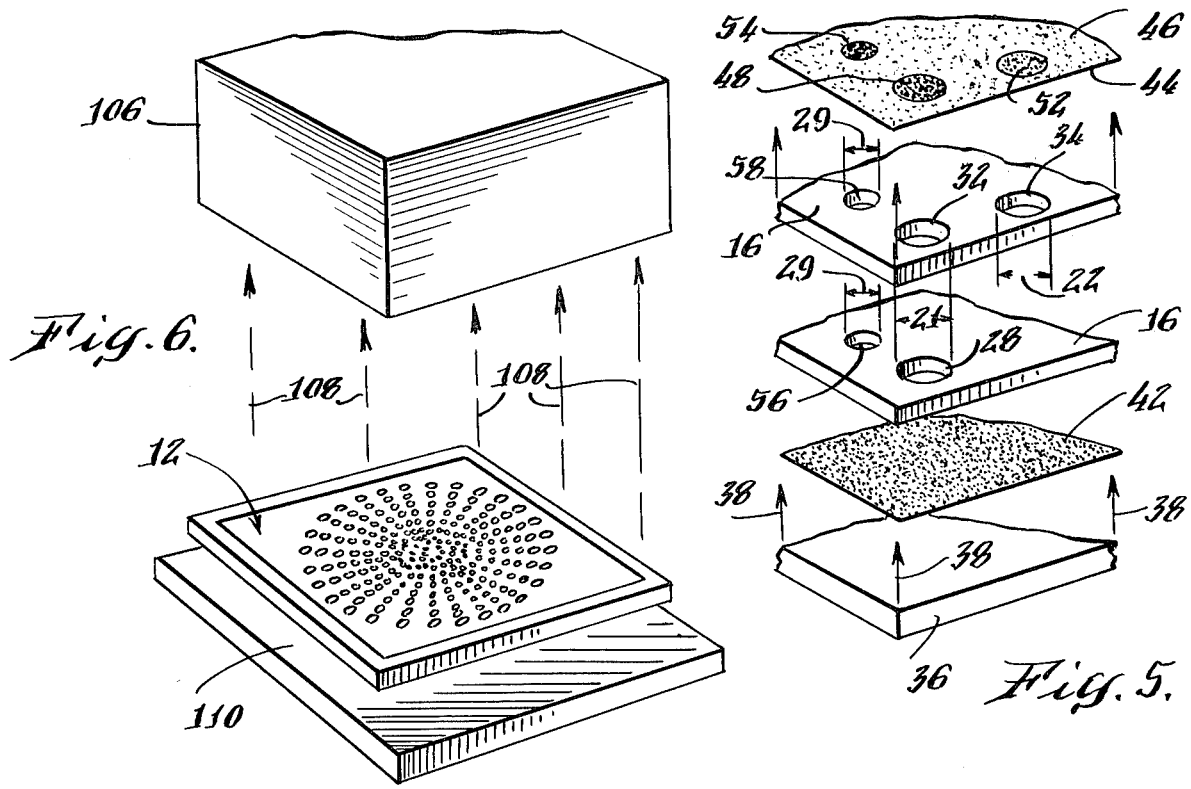
Fig. 6.
Fig. 5.
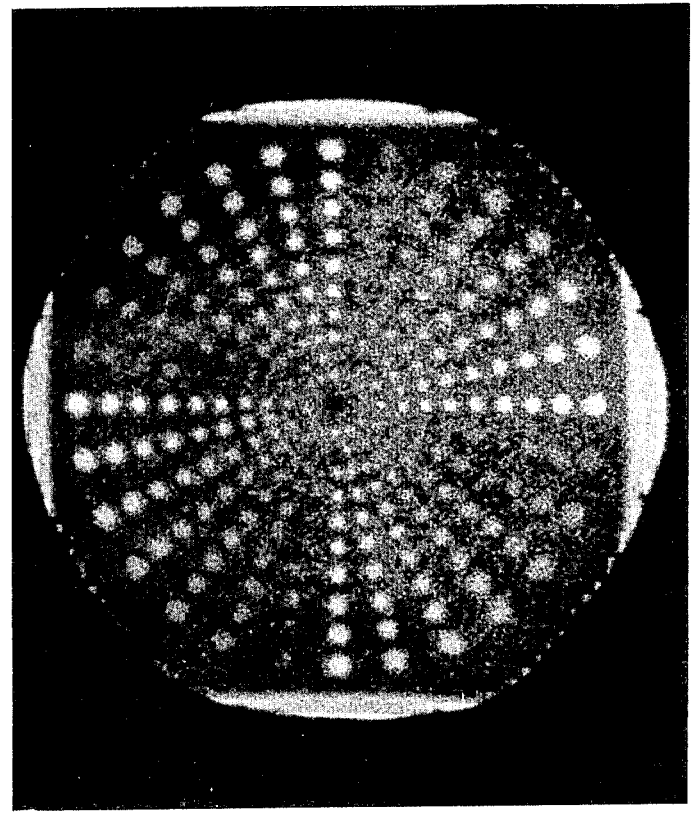
Fig. 7.

ATTENUATOR FOR PROVIDING A TEST IMAGE FROM A RADIATION SOURCE

BACKGROUND OF THE INVENTION

1. Field of the Invention

This invention relates to scintigraphy and, more particularly, the invention relates to an attenuator for providing from a source of radiation a standardized test image to thereby enable routine quality control testing of scintillation camera performance.

2. Description of the Prior Art

The use of scintillation cameras in clinical nuclear medicine laboratories is well known. For example, in the detection of abnormalities, radioisotopes are injected intravenously into an area of the human body and tend to accumulate in the abnormal areas in greater or lesser amounts than in the adjacent normal areas. These abnormal areas emit higher or lower intensity radiation than do the adjacent normal areas. By use of a scintillation camera or other apparatus for sensing radiation images, the existance, the size and the location of the abnormal area can be determined. This information is vital to the clinicians, such as surgeons and radiation therapists, to enable proper treatment of patients.

The intensity of the image emitted from an abnormal region, often termed a "target region", varies with respect to the intensity of the image emitted by the normal region, often termed a "background region". The ratio between the intensity of the target image and the intensity of the background image is termed the "target to background" contrast ratio, hereinafter referred to as the "T/B" ratio. For various abnormal regions, the T/B contrast ratio varies. With abnormal regions that accumulate higher concentrations of radioisotope the T/B ratio may vary from 1.1:1 to about 2.5:1 or more. In clinical scintigraphy, it is important that the camera be sufficiently sensitive and have sufficient resolution to detect target images having T/B ratios within this range.

During repeated clinical use of a camera used to sense images generated by injected radioisotopes, gradual deterioration of the camera performance may occur. This deterioration may be a result of the camera misadjustment or may be a result of breakdown of the photomultiplier tubes or other components of the camera or user error. Thus, subtle and undesirable changes in camera sensitivity and resolution may occur over a period of time.

It is known to use, on a routine basis, devices that generate a standard test image that is imaged by the camera. By comparing the standard test image with the one imaged by the camera, daily changes in camera performance can be detected. It is not unusual for clinical laboratories to institute a program of daily quality control testing of a camera's performance.

One device for generating a standardized test image comprises one or more bars of lead metal placed on a flood source of radiation. By "flood source" it is meant a source that emits an image having a generally uniform intensity over an area. The lead bars substantially completely attenuate the radiation from the flood source thereby providing a target image having a T/B ratio approaching infinity. Although a target image having a T/B ratio that approaches infinity is sufficient for testing resolution and spacial distortion of a camera, it does not provide for testing of camera sensitivity by testing target images having various low contrast T/B ratios.

Another type of device for generating a standard test image is disclosed in Schramm U.S. Pat. No. 4,014,108, which discloses a device comprising a container having a cavity therein having the shape of a brain. Various areas of the cavity have different depths so that when a radioisotope is injected into the cavity, the test image emitted has areas that vary in intensity. Thus, the scintillation camera may be periodically tested using the device disclosed in this patent to determine whether it is properly calibrated and in satisfactory operating order.

The device disclosed in the Schramm patent requires the use and handling of a liquid radioisotope to fill the cavity. One disadvantage of using a liquid radioisotope is that handling of a radioactive liquid presents radiation safety problems. Moreover, when it is desired to change the energy level of the source of radiation, for example from a Cobalt-57 radioisotope emitting a 120 Kev energy level to a Technetium-99m radioisotope having a 140 Kev energy level, the cavity must be drained and then filled with another radioisotope. Moreover, the Schramm device does not emit a plurality of target images spatially separated with respect to each other by a background image having a generally uniform intensity to provide target images having different T/B ratios. Thus, the test image emitted by the device disclosed in the Schramm patent would not simulate the various T/B ratios found in clinical testing.

SUMMARY OF THE INVENTION

In accordance with the present invention, a nuclear radiation attenuator for transmitting a test image from a source of radiation is provided. An attenuator in accordance with a present invention comprises a generally planar body comprising radiation attenuating material. The body includes a background region for transmitting from the source of radiation a background image having uniform intensity. The body includes at least first and second discrete target regions located in the background region. Each target region transmits from the radiation source a target image having an intensity differing from the background image intensity to provide for each target image an intensity contrast ratio between it and background image (hereinafter referred to as a T/B ratio). The first target region transmits from the radiation source a target image differing in intensity from the intensity of the target transmitted by a second target region to provide at least two target images having different T/B ratios. In accordance with one aspect of the present invention, the discrete target regions are spatially separated with respect to each other by the background region to thereby transmit from the radiation source target images that are spatially separated by the background image. Since background image has a uniform intensity and the spatially separated target images have different T/B contrast ratios, scintillation camera sensitivity at low contrast ratios can be tested.

An attentuator in accordance with the present invention is preferably used with a flood source of radiation, that is, a source of radiation that provides an image having uniform intensity over the area of the image. Flood sources of radiation are well known in the art and are typically used in conjunction with lead bars to provide target images having T/B ratios approaching infinity, For example, it is known to use a flood source of Cobalt-57 having an energy level of 120 Kev, a flood source of Technetium-99m having an energy level of 140 Kev or a flood source of Xe-133 having an energy level of 81 Kev. It should be understood that the foregoing sources of radiation are given by example only and that other radiation sources may be used. Although it is preferred that a flood source of radiation be used, it is also possible to use a point source of radiation or other shaped sources so long as the test image transmitted by the attenuator is standardized and capable of being replicated on a routine daily basis.

As radiation travels through an absorber, the amount of attenuation is a function of the energy of the radiation and the type and thickness of the absorbing material. Mathematically, this function may be expressed as follows:

$$I = I_o e^{-\mu_o x}$$

where:

$I_o$ = the intensity of the beam transmitted with no absorber present $I$ = the intensity of the transmitted beam with an absorber present $\mu_o$ = the coefficient of linear attenuation $x$ = the thickness of absorber $e$ = the base of natural logarithms $e^{-\mu_o x}$ = the attenuation coefficient In accordance with another aspect of the invention, the material from which the attenuator body is made has a uniform coefficient of linear attenuation and the background region of the attenuator has a uniform material thickness. The first target region has a material thickness different than the thickness of the background region and the second target region has a material thickness that is different than the thicknesses of the first target region and the background region. A flood source of radiation directed at the attenuator would provide a test image including a background image having uniform intensity and at least two target images having different T/B ratios. In the instance where it is desired that the attenuator provide a test image that simulates an abnormal target that has a higher concentration of radioisotope with respect to the surrounding background concentration of radioisotope, it is preferred that the background region of the attenuator have a uniform thickness that is greater than the thickness of each of the target regions.

In accordance with another aspect of the invention, the attenuator is provided with target regions that not only transmit target images that vary in T/B ratios, but also transmit target images that vary in area. The attenuator in accordance with this aspect of the invention includes at least three target regions wherein the third target region differs in area from the first and second target regions. The third target region transmits from the radiation source a target image having an intensity substantially equal to the intensity of the first target image to thereby provide two target images that are substantially identical in area and that differ in T/B ratios and provide two target images that differ in area and that have substantially identical T/B ratios. Thus, the low contrast sensitivity and resolution of a scintillation camera may be tested.

In accordance with a further aspect of the present invention, the attenuator provides a multiplicity of target images that vary in T/B ratio from approximately 1.1:1 to approximately 2.5:1 thereby simulating the various T/B ratios found in clinical situations. Although the target regions may be located in various patterns within the background region, it has been determined that an excellent test for scintillation camera performance is to have two spatially separated target regions having respective areas sequentially increasing in area along the row and transmitting target images having substantially identical T/B ratios. Thus, for any given row, a person testing the scintillation camera will be able to detect changes in camera spatial resolution. Each adjacent row will transmit target images that differ in intensity from each other to enable a person testing the camera to detect changes in camera sensitivity at low contrast levels.

In accordance with a preferred embodiment of the invention, each row of target region has a linear central line and each target region in the row has a circular shape having it's center located on the center line. The attenuator includes a pattern of at least three rows of target regions wherein rows are spatially separated and extend radially outwardly from a point on the planar body. Target regions in each row transmit from the flood source target images having identical T/B ratios. Adjacent rows of target regions transmit target images sequentially increasing in intensity. For each radially extending row, the target regions therein have sequentially increasing areas as the target region is located further away from the point on the body. Target regions having equal areas are located at equal radial distances from the point to transmit an arc of target images that have substantially equal areas but that vary in intensity to thereby allow detection of extremely small changes in camera performance. In accordance with a preferred embodiment of the invention, the attenuator body includes quadrant area sections wherein each section includes a pattern of the radially extending rows. Thus, camera performance in any of the four quadrants of the camera's field of view may be tested.

In accordance with a preferred embodiment of the invention, the body of the attenuator is formed by a plurality of plates aligned in parallel relation to each other. Thus, the body comprises at least first and second plates, the first plate including a first aperture corresponding in location to the first target region. The second plate includes first and second apertures corresponding in location respectively to the first and second target regions. The first aperture of the second plate has an area identical to and aligned with the first aperture of the first plate. Thus, radiation from the source is attenuated by both plates in the background region, is attenuated by the first plate in the second target region, and is attenuated by neither plate in the first target region. The thickness of each plate and material from each plate is made selected to provide the desired T/B ratio for particular radiation source.

Where it is desired to provide two target images having substantially identical contrast ratios but differing in area and provide two target images that are substantially identical in area but differing in T/B ratio, each of the plates includes an additional aperture. The second plate includes a third aperture differing in area from the first and second apertures thereof which are substantially equal in area. The first plate includes a second aperture differing in area from the first aperture thereof and corresponding in location to a third target region. The second aperture of the first plate is substantially equal in area to and aligned with the third aperture of the second plate. Thus, radiation is attenuated by neither plate in the third region thereby providing an image substantially identical in intensity to and differing in area from the first target image. The first and second target images are substantially identical in area and differ in T/B ratios.

In accordance with a preferred embodiment of the invention, the attenuator includes at least three plates and each plate includes one or more rows of target images. For example, the first plate includes a single row having at least three spatially separated apertures having areas that sequentially increase in area along the length of the row. The second plate includes two rows of spatially separated apertures wherein for each row the apertures sequentially increase in area.

The apertures in the first row of the first plate are in alignment and have areas substantially identical to the apertures of the first row of the second plate. A third plate is provided having three rows of apertures, two of which are in alignment with the two rows of the second plate. It should be understood that the concept of using a plurality of plates may be expanded to four, five, six, seven or more plates, each plate in the sequence having an additional row of apertures.

A nuclear radiation attenuator in accordance with the invention has the advantage that the resolution and sensitivity at low contrast levels of a radiation sensing device such as a scintillation camera may be tested on a routine basis with a standardized test image wherein target images within the test image have various T/B ratios. This enables the camera to be tested with an image that simulates low contrast levels found in clinical images generated by injected radioisotopes. In the preferred embodiment of the invention using at least two plates for forming the attenuator body, the attenuator is particularly simple to construct and is quite effective in transmitting the desired test image. Other advantages of an attenuator in accordance with the invention will be apparent from the following detailed description of the invention with reference to the drawings.

BRIEF DESCRIPTION OF THE DRAWINGS

FIG. 5 is an exploded perspective view of plates I and II and a flood source illustrating diagramatically the image provided by the flood source and the test image transmitted by plates I and II;

FIG. 6 shows a perspective view of a scintillation camera sensing an image from a flood source attenuated by a radiation attenuator shown in FIGS. 1-4; and FIG. 7 is a photograph of a viewing screen of the camera showing an example of an image sensed by the scintillation camera shown in FIG. 6.

DESCRIPTION OF THE PREFERRED EMBODIMENT

Referring to FIGS. 1-5, a nuclear radiation attenuator 12 in accordance with the present invention is shown. The attenuator 12 has a generally planar body 14 that includes a background region 16 comprising a material having an attenuation coefficient that is constant throughout the background region 16. More particularly, the background region 16 is made from a material having a uniform thickness and having a single coefficient of linear attenuation.

Figure 1:
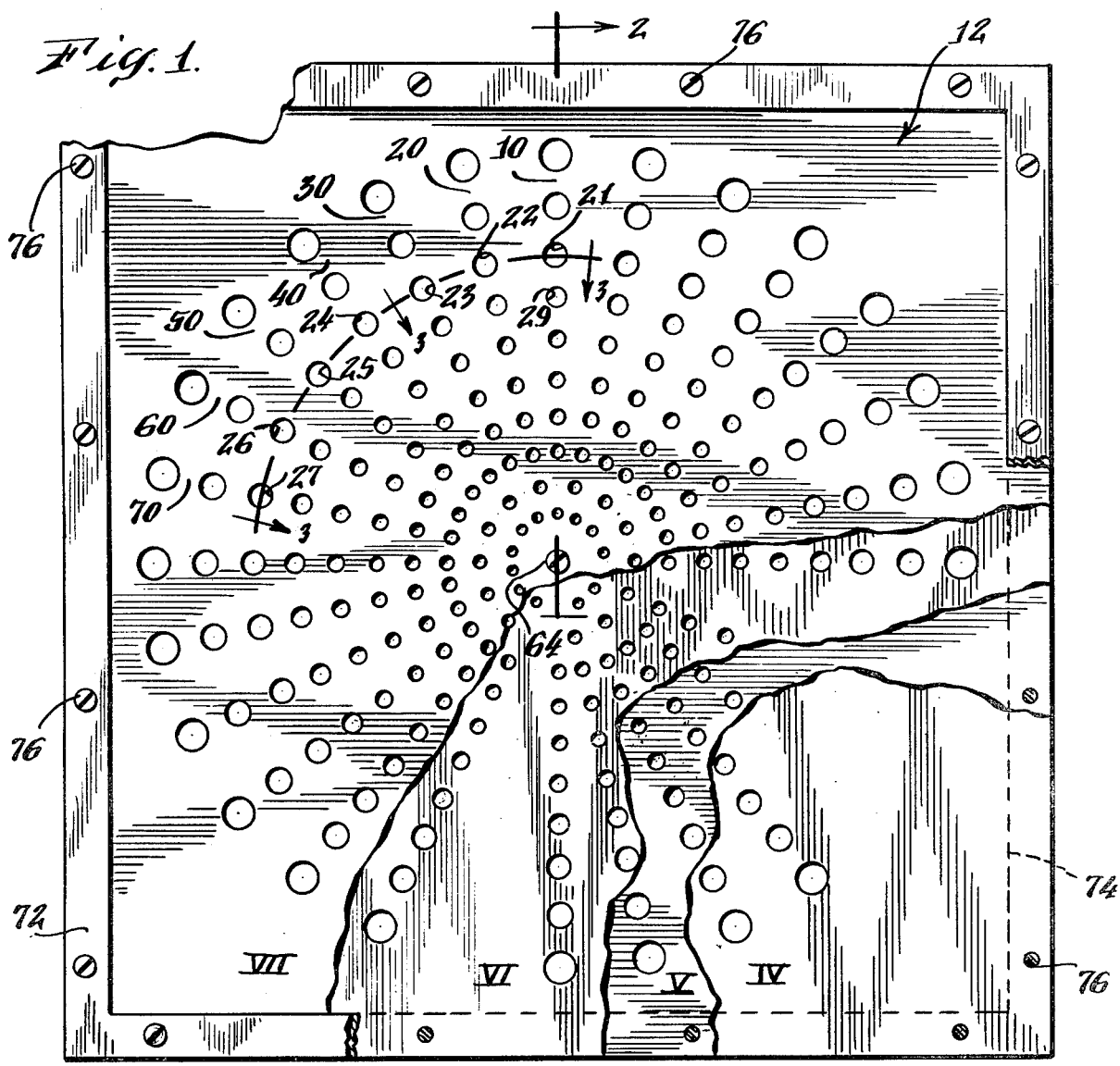
FIG. 1 is a top plan view of an attenuator in accordance with the present invention having portions of plates VII, VI and V broken away.
Figure 3:
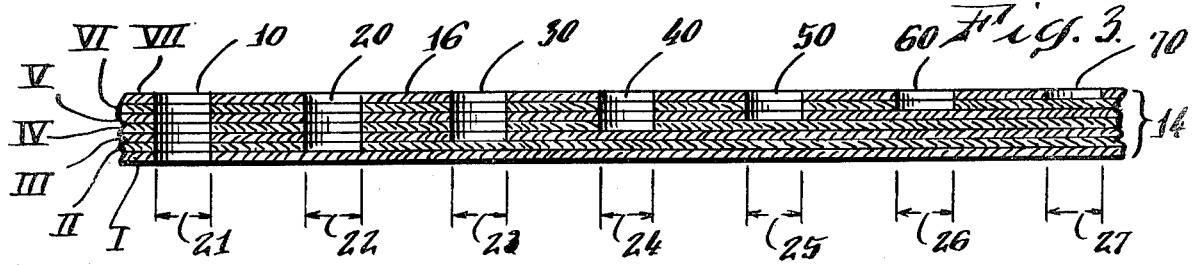
FIG. 3 is a sectional view along the planar arc 3—3—3 of FIG. 1.

Referring to FIGS. 1 and 3, the body 14 includes a plurality of discrete target regions 21, 22, 23, 24, 25, 26 and 27. Each of the target regions 21 through 27 has an attenuation coefficient that differs from the background region attenuation coefficient. Each target region 21 through 27 also has an attenuation coefficient that differs from the attenuation coefficient of the other target regions. These differences in attenuation coefficients are provided by varying the thickness of the attenuating material in each region. Thus, in the target region 21, radiation will pass through it without any substantial attenuation whereas in target region 22, the radiation will be attenuated a slight amount. As the thickness of the material through which the radiation must travel is increased, the attenuation coefficient of the body 14 is increased in accordance with the formula: $I = I_0 e^{-\mu_0 x}$.

Figure 2:
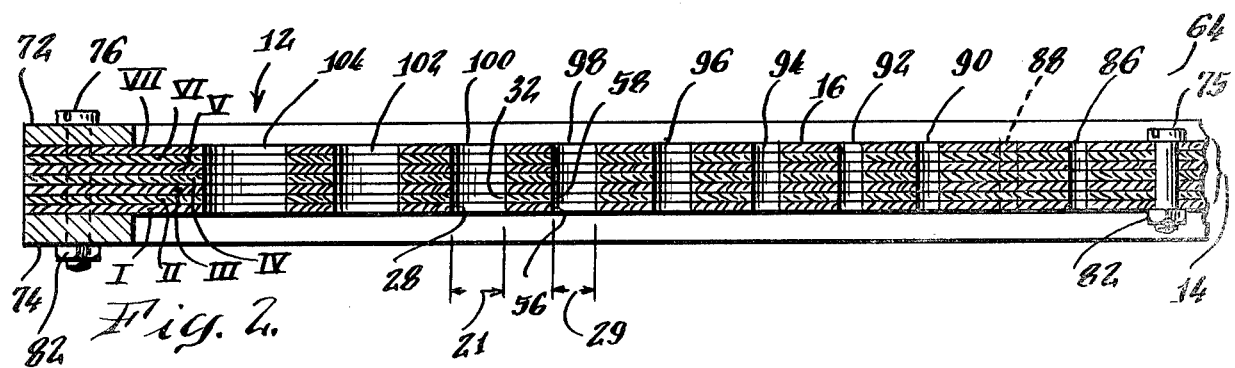
FIG. 2 is a cross-sectional view along the plane 2—2 of FIG. 1.

Referring to FIGS. 1 through 3, the discrete target regions are preferrably spatially separated with respect to each other by the background region 16 to thereby transmit, a radiation source used with the attenuator, target images spatially separated by a background image.

Figure 4:
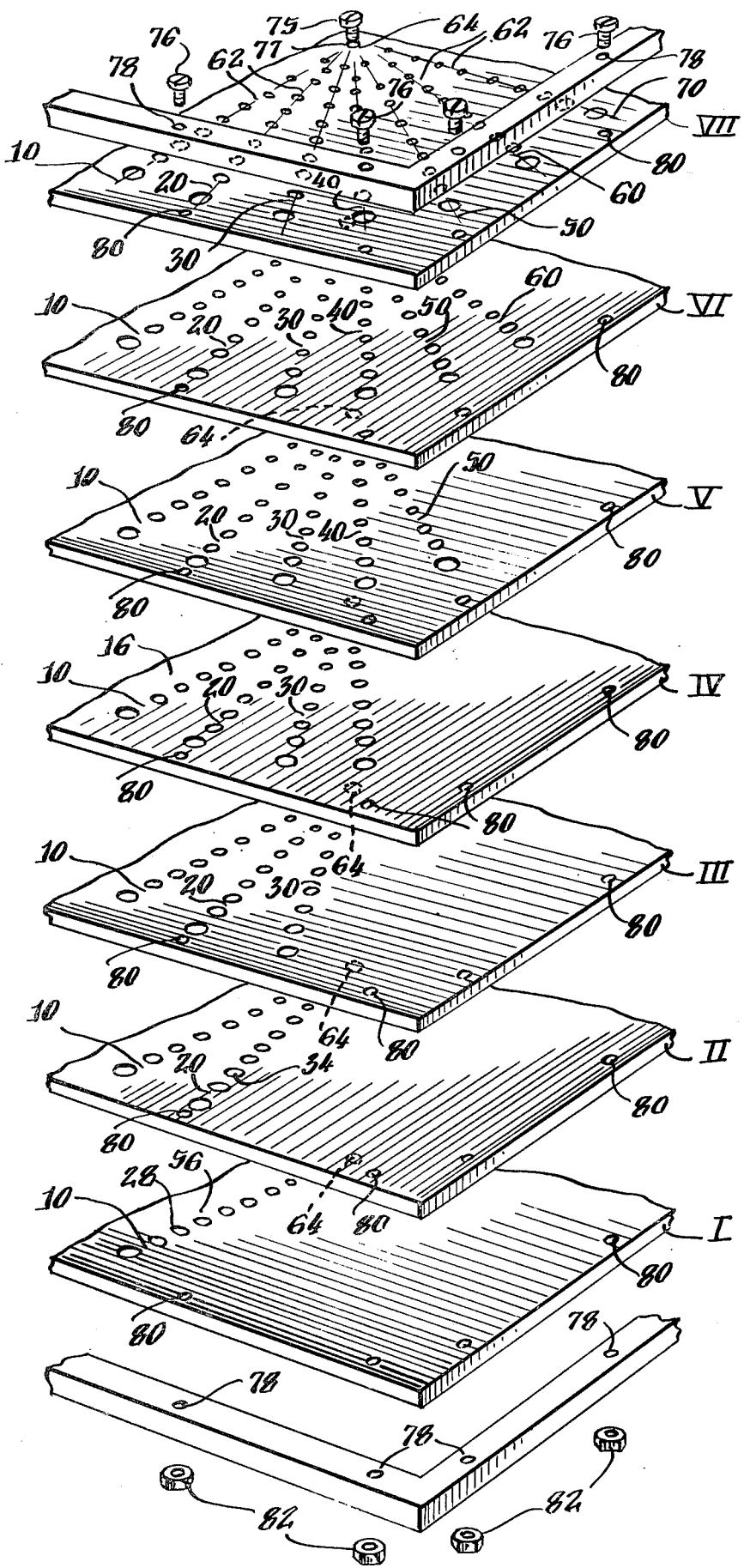
FIG. 4 is an exploded perspective view of one quadrant of the attenuator shown in FIGS. 1-3.

Referring in particular to FIGS. 4 and 5 as well as FIGS. 1 through 3, the body comprises at least a first plate I and a second plate II which are aligned in parallel relation to each other. The body may include three, four, five, six, seven or more plates depending upon the number of T/B ratios desired. The device shown in the drawings, in addition to the first plate I and the second plate II, includes a third plate III, a fourth plate IV, a fifth plate V, a sixth plate VI, and a seventh plate VII.

Referring to FIG. 5 in particular, the function of plates I and II will be first described and thereafter, the function of plates III through VII will be described. As stated earlier, the body comprises at least a first plate I and a second plate II wherein the plates are aligned in parallel relation to each other. As shown in FIG. 5 (and also in FIG. 4), the first plate I includes a first aperture 28 corresponding in location to target region 21. The second plate II includes a first aperture 32 and a second aperture 34 corresponding in location respectively to target region 21 and target region 22. As shown particularly well in FIG. 5, as well as in FIG. 3, the first aperture 32 of the second plate II has an area substantially identical to and is aligned with the aperture 28 the first plate I. A flood source of radiation 36 is provided and emits, as shown schematically by arrows 38, an image 42 having a substantially uniform intensity. The schematical representation of image 42 shows that its intensity is uniform by showing a generally uniformly shaded area. Radiation directed at the plates is attenuated by both plates I and II in the background region 16. The radiation is attenuated by the first plate I in target region 22 and is attenuated by neither plate in target region 21. Test image 44 transmitted through plates I and II includes a background image 46 having a generally uniform intensity that is lower than the intensity of source image 42 due to attenuation. Target regions 21 and 22 transmit respectively from the source 36 target images 48 and 52 each having an intensity that is different from the intensity of the background image 46 to provide for each target image an intensity contrast ratio between it and the background image 46. The target region 21 has a different attenuating coefficient than target region 22 to provide target images 48 and 52 having different T/B ratios.

Referring to FIG. 5, the plates I and II each have an additional aperture to transmit a third target image 54 having a T/B ratio substantially identical to that of target image 48 but having an area different than target image 48 to enable camera resolution to be tested. More specifically, the first plate I includes a second aperture 56 that differs in area from the aperture 28. The second plate II includes a third aperture 58 differing in are from first and second apertures 32 and 34, which are substantially equal in area. Aperture 58 of plate II and aperture 56 of plate I correspond in location to target region 29 (see also FIGS. 1 and 2). As shown in FIG. 5, radiation is attenuated by neither plate and the third target region 29 thereby providing a target image 54 having a T/B ratio substantially identical to the T/B ratio of the target image 48 but differing in area with respect to target image 48. Thus, resolution of a scintillation camera or other sensing apparatus may be tested.

The concept of providing target images which differ in T/B contrast ratio as well as in area can be expanded to provide many target images having various T/B ratios and areas thereby simulating T/B ratios and areas found in clinical testing.

Referring in particular to FIGS. 1 and 4, the body 14 of the attenuator includes at least two spatially separated rows 10 and 20 of target regions. Each row 10 and 20 includes at least three spatially separated target regions having respective areas sequentially increasing in size along the length of the row and transmitting target images having identical T/B ratios. Each row transmits respective target images that differ in intensity from the adjacent row. For example, the target regions in row 10 all have a substantially identical attenuating coefficient and the target regions in row 20 also have a substantially identical attenuating coefficient. However, the attenuating coefficients of the target regions in row 10 differ from the attenuation coefficients of the target regions in row 20.

Preferably, each row has a linear center line 62 and each target region within the row has a circular shape having a center located on the center line. The rows 10 and 20 extend radially outwardly from a point 64 on the planar body 14. Preferably, for each radially extending row 10 and 20, the target regions therein have sequentially increasing areas as they are located further away from point 64. Target regions having substantially identical areas are located at equal radial distances from point 64 (see FIGS. 1 and 3).

As shown in FIG. 4, as well as in FIGS. 2 and 3, the body includes seven plates I, II, III, IV, V, VI and VII. Each plate includes at least one row of apertures that sequentially increase in size along the length of the row. The first plate I has one row 10. The second plate II has two rows 10 and 20, the apertures of row 10 of plate II aligned in coincident relation to the apertures of row 10 of the first plate I. The third plate includes three rows 10, 20 and 30. Rows 10 and 20 of plate III are aligned in coincident relation with rows 10 and 20 of plate II. Plate IV includes four rows 10, 20, 30 and 40 wherein the first three rows 10, 20 and 30 are aligned in coincident relation respectively with rows 10, 20 and 30 of plate III. Plate V includes five rows 10, 20, 30, 40 and 50, four of which are aligned in coincident relation with the four rows of plate IV. Likewise, plate VI includes six rows 10, 20, 30, 40, 50 and 60, five of which are aligned in coincident relation with the five rows of plate V. In a similar manner, plate VII includes seven rows 10, 20, 30, 40, 50, 60 and 70, six of which are aligned in coincident relation with six rows of plate VI. Thus, as can be well appreciated, if it is desired to have more than seven contrast ratios, the number of plates can be increased or if less than seven contrast ratios are desired, the number of plates may be decreased.

Referring to FIGS. 2, 3 and 4, the plates I through VII are positioned in parallel relation with respect to each other, and most preferably in abutting relation as shown in FIGS. 2 and 3. The attenuator includes a mechanism for securing the plates in parallel relation to each other. The mechanism comprises a pair of frames 72 and 74 which may be made of any suitable materials such as, for example, plastic. The frames 72 and 74 sandwich the plates I-VII therebetween and are secured with respect to each other by a plurality of screw fasteners 76 that extend through holes 78 in frames 72 and 74 and extend through holes 80 in plates I through VII. A central screw fastener 75 extends through holes 77 in the plates. The fasteners 76 are grasped by nuts 82 which enable frames 72 and 74 and the plates to be clamped together to form an attenuator as shown in FIGS. 2 and 3.

It should be understood, that plates I through VII are shown in sequential order to enable the concept of the invention to be better understood. As can be appreciated, the order of the plates may be rearranged and the attenuator coefficient will still be the same for each target region as long as the rows of the plates are in alignment. However, it is desirable to have the plate which includes the maximum number of apertures, that is plate VII, at one extreme end to enable a person using the attenuator to see the pattern of the target regions.

As mentioned in a preceeding discussion, the areas of the target regions preferably increase in size along the length of a row. The areas selected for each target region within a row will depend upon the clinical situation to be simulated. In the attenuator in accordance with the present invention, it is desirable to provide at least one target region that is smaller in area than the resolution power of the scintillation camera or other apparatus being tested and that the size of the target regions in a row increase incrementally to a size that may almost certainly be resolved by the camera. Referring in particular to FIG. 2, for simulating lesions, target regions 86, 88, 90, 92, 94, 96, 98, 100, 102 and 104 preferably have respective diameters of four, four, five, six, seven, eight, nine, ten, twelve and fourteen millimeters. (Regions 86 and 88 have the same size but are located in different adjacent rows).

In the preferred embodiment of the invention, plates I through VII are made of the same material. Although copper is the preferred material, other metals, alloys of metals, ceramics, plastics and various other materials that attenuate radiation may be used. In the preferred embodiment of the invention, each of the plates I-VII has a substantially identical thickness. It should be understood, however, that the thickness of the plates may be varied to achieve various T/B ratios. Moreover, the plates of one attenuator may be made of different materials, also to achieve various T/B ratios for the target images provided. As shown in FIG. 5, the image 44 provided has target images 48, 52 and 54 which have an intensity higher than the intensity of the background image 46. These images having high intensities are typically termed "hot" images against a "cold" background. Where it is desired to provide a test image having a hot background image with cold target images, the background region 16 of the body may be selected to have a lower attenuation coefficient than the target regions of the body thereby providing a plurality of cold target images on a hot background image.

A particular example of the use of a nuclear radiation attenuator in accordance with the present invention will now be described primarily with respect to FIGS. 6 and 7, but also with respect to the other figures.

EXAMPLE

The nuclear radiation attenuator of this example is shown in FIGS. 1-4. The plates I-VII each have a thickness of 0.0216 inches and are made of rolled copper. The thickness and the material was selected after experiments to derive appropriate absorption coefficients for each target region for gamma radiation having an energy level of between 120 and 140 Kev. The attenuator was fabricated by drilling apertures of different sizes in the seven plates of copper with nine apertures per row. As discussed previously, the aperture diameters ranged from 4 to 14 mm. The T/B ratio for each target region was calculated theoretically from the linear attenuation coefficient of copper for the energy level 120-140 Kev and the material thickness of the copper in any given target region. The calculated T/B ratio of rows 10, 20, 30, 40, 50, 60 and 70 was respectively approximately 2.5:1, 2.2:1, 1.9:1, 1.7:1, 1.5:1, 1.3:1 and 1.1:1 for an energy source of 140 Kev provided by a Technetium-99m flood source. The plates I-VII were held together by plastic frames and measured 42 cm.×42 cm. and 1.4 cm. thick.

The scintillation camera used was a PICKER DYNACAMERA 4-15, large field of view, with an intrinsic resolution of 0.5 cm. full width half maximum at face, with a low energy general purpose collimator having seventeen thousand six hundred (17,600) holes of 0.090 inches and septal thickness of 0.010 inches, a collimater thickness of 1.43 inches and with a system resolution of 0.055 cm. full width half maximum at face.

Referring to FIG. 6, the scintillation camera 106 is shown schematically. A test image shown by arrows 108 is provided from a flood source 110 of Technetium-99m having an energy level of 140 Kev. Attenuator 12, as previously described, is located between flood source 110 and the camera 106. The camera had a standard window setting of 20% and a preset count of 3,000,000. The image sensed by scintillation camera 106 is shown in FIG. 7, which is a photograph of the viewing screen of the camera 106.

As shown in the photograph of FIG. 7, it was possible to detect 4.0 mm. target images having T/B ratios of 2.5:1 and 2.2:1, whereas 4.0 mm. target images having a T/B ratio of 1.7:1 or less were not resolved by the camera. The 12 mm. target images having T/B ratios as low as 1.1:1 could be resolved by the camera. As can be seen in the photograph of FIG. 7, the test images of each of the four quadrants were substantially identical, thus indicating that the camera had substantially the same sensitivity and resolution in each of the quadrants of its field of view.

It should be understood that the particular source of radiation and the sizes, the thicknesses and the material of the target regions and the background region given in the foregoing example are given by way of example only.

Having thus described a nuclear radiation attenuator which provides a standardized test image, the advantages of the invention can be appreciated. Variations from the described embodiment can be made without departing from the scope of the invention.

What is claimed is:

1. A nuclear radiation attenuator for providing a test image from a flood source of radiation for testing a scintillation camera comprising:

a plurality of stackable plates formed of radiation attenuating material and selected so that a plate provides a background region of substantially uniform background radiation passed therethrough from said flood sources, each of said plates having a generally uniform thickness;

said plates each including a plurality of apertures which form discrete target regions located in the background region of the plate, each target region enabling the transmittal of radiation from said flood source with an intensity that differs from the radiation passed through said background region to provide for each target region a desired target to background intensity contrast ratio between it and said background region, said apertures being regularly distributed over a plate to enable examination of the linearity of said camera, and with the size of said apertures being selected to provide an indication of the spatial resolution of said camera and wherein wherein the apertures in the plates are so located that when said plates are stacked, first target regions each have a material thickness that is different from the combined plates background region thickness and wherein second target regions have a material thickness that is different from the thickness of said first target regions and said combined plates background region.

2. A nuclear radiation attenuator according to claim 1 wherein said plates have apertures of different sizes which are arranged to form third target regions that each differ in area from said first and second target regions, but pass radiation from said flood source with an intensity equal to the radiation intensity passed by said first target regions to thereby provide, across said plates, target images that are substantially identical in area but differ in intensity as well as target images that differ in area and but are substantially identical in intensity.

3. A nuclear radiation attenuator according to claim 2 wherein the apertures in said plates are arranged along radially aligned rows with each row including at least three spatially separated target regions whose respective areas sequentially increase radially outward along the row while the target images along a row have substantially identical intensity, with sequential row transmitting respective target images that differ in intensity.

4. A nuclear radiation attenuator according to claim 3 wherein adjacent rows of target regions pass radiation with sequentially increasing intensities.

5. A nuclear radiation attenuator according to claim 4 wherein for said rows in said pattern, said target regions having substantially identical areas are located at substantially equal radial distances from a central point.

6. A nuclear radiation attenuator according to claim 5 wherein said plate apertures are arranged so as to include at least two area sections having a like pattern of rows of said apertures.

7. A nuclear radiation attenuator according to claim 6 wherein said plate apertures are arranged so as to include quadrant area sections each having a like pattern of rows of said apertures.

8. A nuclear radiation attenuator for providing a test image from a radiation source comprising:
a body formed of a plurality of stacked plates having apertures, with apertures of different plates being aligned with each other to form discrete target regions, with the portion of the body lying between the plates providing a background region with a radiation attenuation that is substantially constant throughout the background region so as to transmit radiation from said source as a uniform background image;
said apertures being of substantially equal area and regularly distributed over the body with each target passing radiation with an intensity that differs from radiation passed through said background region to provide a target to background intensity contrast ratio, with the number of plates in said body being selected to provide a target to background ratio that lies in the range between 1.1 to 1 and 2.5 to 1 wherein the apertures in the respective plates are so distributed that selected ones of apertures in different plates align while other apertures in plates align with a background region of a plate so that said body provides a plurality of regularly distributed target regions with different target to background ratios.

9. A nuclear radiation attenuator according to claim 8 wherein the plates are made of a predetermined material and have a thickness so that each plate provides a target to background ratio that lies in said range.

10. A nuclear radiation attenuator according to claim 9 wherein said plates are made of copper.

11. A nuclear radiation attenuator for providing a test image from a radiation source comprising:
a body of stacked generally flat plates, each of which comprises radiation attenuating material, said body including a background region having a substantially uniform material thickness;
said body including a plurality of target regions located in said background region and having a thickness that is smaller than the thickness of said background region, each said target region having a material thickness differing from said background region thickness, each said target region transmitting from said source a target image having an intensity that differs from said background image intensity to provide for each target image an intensity contrast ratio between it and said background image, a first said target region differing in material thickness from a second target region to provide target images having different contrast ratios, said body further comprising at least first and second plates aligned in parallel relation to each other, said first plate including a first aperture corresponding in location to said first target region, said second plate including first and second apertures corresponding in location respectively to said first and second target regions, said first aperture of said second plate having an area substantially identical to and being aligned with said first aperture of said first plate so that radiation is attenuated by both said plates in the background region, so that radiation is attenuated by said first plate in said second target region and radiation is attenuated by neither plate in said first target region said first and second apertures of said second plate being substantially equal in area to each other, said second plate including a third aperture differing in area from said first and second apertures of said second plate and corresponding in location to a third target region, said first plate including a second aperture differing in area from said first aperture of said first plate and corresponding in location to said third target region, said second aperture of said first plate being substantially identical in area to and aligned with said third aperture of said second plate, whereby radiation is attenuated by neither plate in said third region thereby providing a target image substantially identical in intensity and differing in area to said first target image, said first and second target images being substantially identical in area and differing in intensity.

12. A nuclear radiation attenuator according to claim 11 wherein said body includes a section comprising at least four plates, each plate including at least one row of at least four apertures sequentially increasing in area along the length of said row, said first plate having one said row, said second plate having two said rows, one of which being aligned in coincident relation to said row of said first plate, said third plate having three rows, two of which being aligned in coincident relation to said two rows of said second plate, and said fourth plate having four rows, three of which being aligned in coincident relation to said three rows of said third plate.

13. A nuclear radiation attenuator according to claim 12 wherein said aligned plates are positioned in abutting relationship.

14. A nuclear radiation attenuator according to claim 13 further including at least two spatially separated rows of target regions, each row including at least three spatially separated target regions having sequentially increasing area along the length of the row and transmitting target images having substantially identical intensity, each said row transmitting respective target images that differ in intensity.

* * * * *